United States Patent [19]
Cehelnik et al.

[11] Patent Number: 5,171,499
[45] Date of Patent: Dec. 15, 1992

[54] METHOD OF FORMING STRIP PRODUCTS FROM THERMOPLASTIC MATERIALS

[75] Inventors: Edward C. Cehelnik, Cleveland; Loren A. Easterday, Avon; James Neligan, Columbia Station; Mark A. Remington, Strongville; Johnny R. Socausky, Cleveland; Douglas N. Malm, Brecksville, all of Ohio

[73] Assignee: The Standard Products Company, Cleveland, Ohio

[21] Appl. No.: 787,837

[22] Filed: Nov. 5, 1991

[51] Int. Cl.⁵ .............................................. B29C 47/04
[52] U.S. Cl. .............................. 264/151; 156/244.18; 264/163; 264/171; 264/177.10; 264/177.19; 264/177.20; 264/178 R; 264/210.2
[58] Field of Search .............. 264/171, 177.10, 177.17, 264/177.19, 151, 163, 210.2, 178 R, 177.20; 425/363; 156/244.27, 244.18

[56] References Cited

U.S. PATENT DOCUMENTS

| | | | |
|---|---|---|---|
| 3,440,129 | 4/1969 | Anselm | 264/174 |
| 4,172,745 | 10/1979 | Van Manen | 264/339 |
| 4,323,533 | 4/1982 | Bramhall | 264/148 |
| 4,563,320 | 1/1986 | Morgan | 425/363 |
| 4,566,929 | 1/1986 | Waugh | 264/171 |

FOREIGN PATENT DOCUMENTS

| | | | |
|---|---|---|---|
| 2527125 | 12/1976 | Fed. Rep. of Germany | 264/148 |
| 54-11977 | 1/1979 | Japan | 264/45.9 |
| 1186211 | 4/1970 | United Kingdom | 264/171 |

*Primary Examiner*—Jeffery Thurlow
*Attorney, Agent, or Firm*—Harness, Dickey & Pierce

[57] ABSTRACT

A method of forming an elongated trim strip product by first extruding a first strip of thermoplastic material from a die having an outlet with an area at least substantially as great as the desired cross-sectional area of the strip product in planes perpendicular to the direction of extrusion. Immediately subsequent to the step of extruding and while the extruded strip is still in a plastic state, it is passed longitudinally between cooperating forming rolls to shape the cross section of the extruded strip to the desired shape and cross section of the strip product. While the extruded strip is passing between the cooperating forming rolls, a backing strip of foil or thin metal is directed between the rolls in alignment with the extruded strip to bond the backing strip to the extruded strip.

11 Claims, 2 Drawing Sheets

METHOD OF FORMING STRIP PRODUCTS FROM THERMOPLASTIC MATERIALS

BACKGROUND OF THE INVENTION

The subject invention is directed toward the art of plastic forming and, more particularly, to a method of forming strip-like products from thermoplastic materials.

The invention is especially suited for forming trim strips and decorative strip components for vehicle bodies and will be described with particular reference thereto; however, as will become apparent, the invention is capable of broader application and could be used for forming a variety of strip-like products from thermoplastic materials.

Decorative and protective trim strips formed from thermoplastic materials are in widespread use in the automotive industry. The strips have been formed by both injection molding and extrusion processes. Both of these processes have certain disadvantages which make them less than ideal for high volume, high speed production of such strip products. For example, when injection molding such strip products, the effective rate of production is closely tied to the number of die cavities available. Moreover, dies for such products are relatively cumbersome and expensive. Additionally, the cycle time for such products tends to be relatively long because the strip products are flexible and very difficult to remove from the mold cavities and handle without damage until after they have cooled significantly.

Different but equally difficult problems are encountered when attempting to extrude such strip products. First, the use of the extruding process is generally limited to products of uniform cross section throughout their length. Secondly, it is very difficult to handle the extruded product and move it through the necessary cooling bath without deforming it and rendering it unsuitable for use. In addition to the above, the end shapes and contours of extruded products are limited to what can be accomplished by simple cutting operations.

BRIEF DESCRIPTION OF THE INVENTION

The subject invention overcomes the above-discussed problems and disadvantages and provides a greatly improved method for producing strip-type products from thermoplastic materials. In accordance with the invention, the method comprises extruding a first strip of thermoplastic material from a die having an outlet with an area and general shape at least substantially as great as the cross-sectional area of the desired strip in planes perpendicular to the axis of extrusion. Immediately subsequent to the step of extruding, and while the extruded strip is still in a plastic state, it is passed longitudinally between cooperating forming rolls having an external shape and contour to form the first extruded strip to its final desired shape and cross section. Additionally, while the extruded strip is passing between the cooperating forming rolls, a metal backing strip is passed simultaneously between the forming rolls and in alignment with the extruded strip to bond the metal backing strip thereto.

By using the forming rolls while the extruded strip is still in a warm plastic state, it is possible to form the extruded strip into its desired final shape with the possibility existing of providing varying cross sections longitudinally of the strips merely by changing the surface formation of the forming rolls. Additionally, by bonding the backing strip to the extruded strip, the extruded strip can be readily handled and pulled through subsequent cooling baths and the like. In addition, the backing strip can facilitate subsequent use of the formed strip.

In accordance with a further aspect of the invention, the metal backing strip and the extruded strip can be cut to length simultaneously with their passage through the forming rolls. That is, the forming rolls can have their surface contours such that the end shape of the strip product is formed and cut to length. Additionally, as opposed to a conventional extruded product, the end shapes can be contoured.

In accordance with yet another aspect of the invention, the first strip can be formed by a co-extrusion process to provide a multi-layered extrusion. This allows the resulting product to have an outer skin of one color and an inner body portion of a second color. Alternatively, plastics having different physical characteristics can be bonded to provide a final strip with differing properties at transverse points within it.

As can be seen from the foregoing, a primary object of the invention is the provision of an improved method for forming elongated thermoplastic strip members.

Yet another object of the invention is the provision of a method which allows high speed production of strip-like products from thermoplastic materials through the use of conventional extruding and roll forming techniques.

A still further object is the provision of a method of the type described which can be used to produce multi-layered strip products having cross-sectional variations along their length.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED AND ALTERNATE EMBODIMENTS

Figure 1:
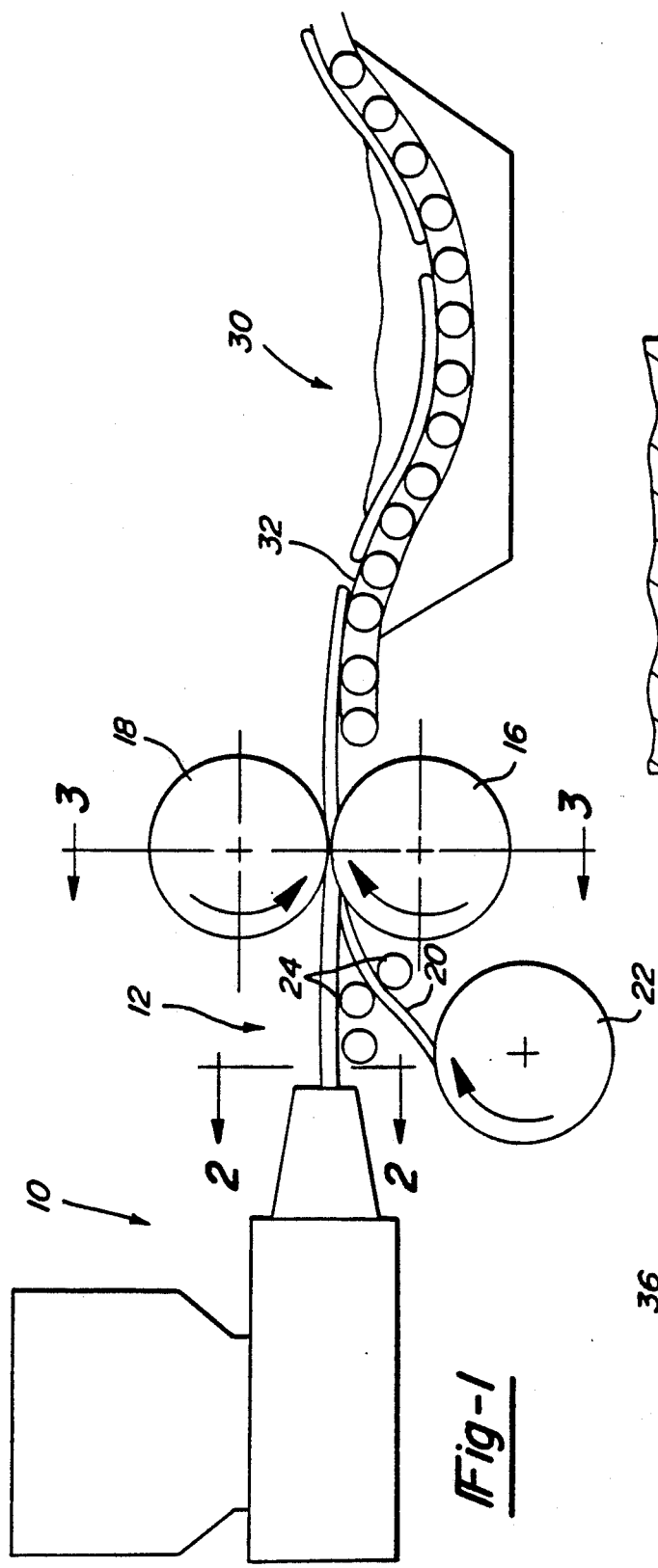
FIG. 1 is a side elevational view in diagrammatic form illustrating the general sequence of processing steps of the subject invention.

Referring in particular to FIGS. 1 through 4, the overall arrangement and sequence of processing of the subject invention can be most clearly understood. As illustrated in FIG. 1, the invention is generally concerned with forming elongated, strip-like products from any suitable thermoplastic material such as a flexible polyvinyl chloride, a thermoplastic olefin or a thermoplastic urethane. Obviously, those skilled in the art will become aware of other materials which could equally well be used as the description proceeds.

In particular, FIG. 1 shows a conventional screw-type extruding machine 10 which is arranged to produce a first strip 12 having a predetermined desired cross-sectional shape which is of the same general shape as the desired final cross section of the strip which is ultimately to be produced. As will subsequently become apparent, the actual shape of the extruded strip can vary substantially from the final shape, but should preferably be at least as great in total cross-sectional area as the maximum cross-sectional area of the final strip product.

Figure 5:
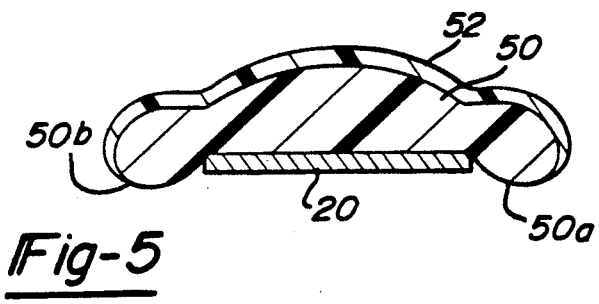
FIG. 5 is a cross-sectional view taken on line 5—5 of FIG. 5.

After exiting from the extruder, the strip is suitably supported by a roll conveyor or table and fed directly to a pair of opposed forming rolls 16 and 18 which are positioned with their axes of rotation extending perpendicular to the direction of movement of the strip element. The forming rolls 16 and 18 are driven in synchronized relationship and have a cooperating outer surface configuration which is arranged to form the strip product to its desired final cross-sectional configuration. As can be appreciated, the rolls have a surface contour and mate to form the first extruded strip to the desired final cross-sectional configuration which can be varied longitudinally along the strip product. For example, as illustrated in FIG. 5, the strip can vary from a relatively wide area at one end to a somewhat narrower shape at the trailing end. The cross section along this strip can be as illustrated in FIG. 3, for example.

Simultaneously with the passage of the extruded strip through the forming rolls 16 and 18, a strip of thin metal backing material 20 is fed into position between one side of the extruded strip and the corresponding rolls 16 or 18. In the FIG. 1 showing, a thin strip of aluminum 20 of perhaps, 0.010 to 0.20 inches in thickness is fed from a reel 22 through a pair of cooperating rolls 24 to a position beneath the extruded strip and above the forming roll 16. The strip 20 is maintained in alignment with the extruded strip and is bonded thereto during passage between the forming rolls 16, 18. The actual bonding of the strip 20 to the extruded strip 12 can be, of course, improved by the use of various surface treatments on the strip if desirable or necessary.

The backing strip 20 acts to reinforce the resulting strip product and, in many product types, serves as a mounting means for connecting the resulting product to the associated vehicle body panels and the like. In the FIG. 1 showing, the backing strip 20 provides means for conveying the formed strip product through a subsequent cooling bath 30. In this showing, the bath 30 is merely a water bath through which the strip products are conveyed from the forming rolls 16 and 18 by a suitable belt-type conveyor apparatus 32. It should be appreciated that any of a variety of types of conveying or pulling devices could be used for engaging the metal backing strip 20 and propelling the formed products to or through any of various types of cooling apparatus.

Figure 3:
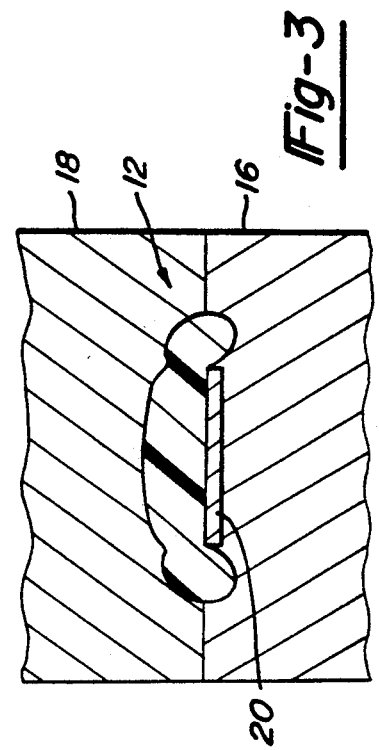
FIG. 3 is a cross-sectional view through the strip and the forming rolls (the view is taken at line 3—3 of FIG. 1)
Figure 2:
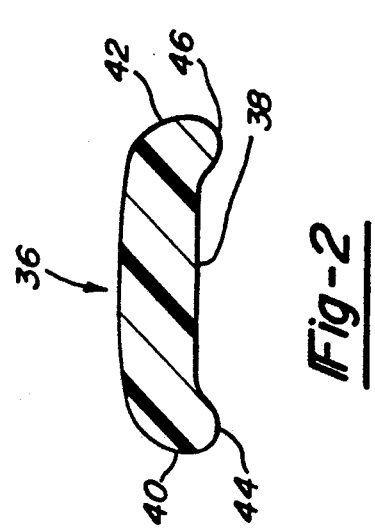
FIG. 2 is a cross-sectional view of the extruded strip immediately prior to the forming rolls (the view is taken at line 2—2 of FIG. 1)
Figure 4:
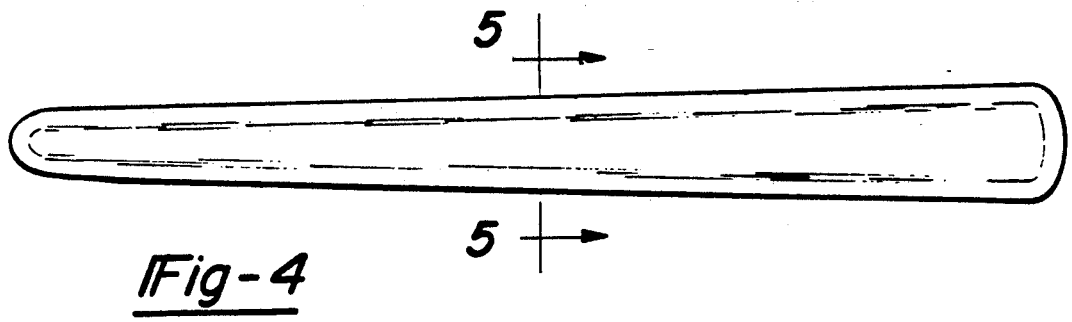
FIG. 4 is a plan view of a typical strip product which can be formed with the subject invention.

FIGS. 2 and 3 generally illustrate an example type extruded strip and resulting product cross section. In FIG. 2, the extruded strip is shown as having a somewhat convex upper surface and a generally flat lower surface 38. The lateral edges 40, 42 are rounded and downwardly extending bead-like protrusions 44 and 46 extend along edges 40, 42, respectively. This provides general alignment for the receipt of the metal strip 20 and, as shown in FIG. 3, the strip can be sized to mate within the flat space between beads 44 and 46. The FIG. 4 showing illustrates the cross-sectional area and shape of forming rolls at the location at which the FIG. 3 cross section is formed. As illustrated therein, the FIG. 2 cross section is refined to the desired final cross section through the shaping of the forming rolls, and the beads 44 and 46 are further formed by roll 16 to the point where they extend below the lower surface of the aluminum backing strip 20. This shape can thereafter be mechanically cut to remove the beads to a level corresponding to the level of the surface of the backing strip 20. In many instances, the mechanical cutting of the formed surface of the strip allows the strip to better conform to the surface to which it is to be attached and to provide a sharp, clean peripheral edge corner which cannot always be obtained during the roll forming operation.

Figure 6:
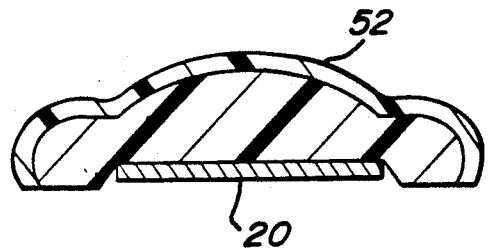
FIG. 6 is a view like FIG. 5 but showing the product after a final mechanical treatment step; and, FIG. 7 is a cross-section through a modified form of strip.

FIG. 5 shows an alternative form for products which can be produced by the subject method. In FIG. 5, the main body of the strip is formed from a first thermoplastic material identified with the numeral 50. Through conventional co-extruding techniques, a surface layer 52 of a differing thermoplastic material can be simultaneously extruded over the core strip 50 prior to the passage of the extruded strip through the forming rolls 16, 18. This formed strip with the aluminum backing 20 can subsequently be mechanically cut or shaped to remove the tab portions 50a and 50b to provide the smooth planar back illustrated in FIG. 6 and discussed in general terms with reference to the FIG. 3 product.

As shown in FIG. 5, the strip products formed by the invention can have contoured ends and cut to length by the forming rolls 16, 18. Merely by proper shaping of the forming rolls, a severing portion can be inserted into the rolls so that the products are cut to discrete lengths and shapes during rotation of the rolls.

Figure 7:
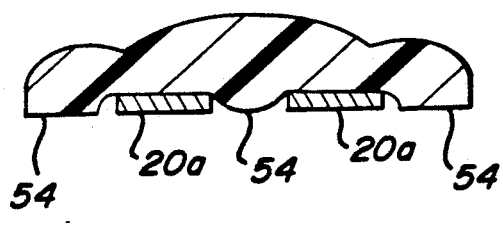

FIG. 7 shows a modified form of strip possible with the invention. In this form, two backing strips 20a are bonded to the back between formed bead-like portions 54. Alternatively, perforated backing strips could also be used.

Under certain conditions and for certain uses, the backing strips could be in the form of a thin film of metal or other material capable of withstanding the temperature of the extrudate. In any event, the material selected for the backing strip should be chemically compatible with the extrudate and should also have the physical characteristics to provide the necessary strength for pulling the extruded strip through the cooling bath and to allow subsequent handling, mounting, and use of the thin strips.

The invention has been described in great detail sufficiently wherein one of ordinary skill in the art can make and use the same. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A method of forming an elongated trim strip comprising the steps of:
   extruding a first strip of thermoplastic material from a die having an outlet with an area at least substantially as great as the desired cross-sectional area of the strip in planes perpendicular to the direction of extrusion;
   immediately subsequent to the step of extruding and while the extruded strip is still in a plastic state, passing the extruded strip longitudinally between cooperating forming rolls to shape the cross section of the extruded strip to a desired shape and cross section; and, while said extruded strip is passing between the cooperating forming rolls, simultaneously passing a backing strip for providing the necessary strength to the extruded strip for pulling of the first strip through a cooling bath and for handling and mounting of the elongated trim strip between the cooperating forming rolls in alignment with the extruded strip to bond the backing strip to the extruded strip.

2. The method as set forth in claim 1 wherein the cooperating forming rolls are configured to form the strip with outwardly extending protrusions adjacent the backing strip and longitudinally along the edges of the extruded strip and including the further step of mechanically removing portions of the protrusions to reduce the protrusions of a height relatively coextensive with the outer surface of the backing strip.

3. The method as set forth in claim 1 including the step of co-extruding a second strip of thermoplastic material in juxtaposed position to said first strip and passing it through the cooperating forming rolls simultaneously therewith.

4. The method as set forth in claim 1 including the additional step of pulling the extruded strip through a cooling bath after it has passed through the cooperating forming rolls.

5. The method as set forth in claim 4 including the step of pulling the extruded strip through the cooling bath by applying the necessary pulling forces to the backing strip.

6. The method as set forth in claim 1 including the step of rotating the cooperating forming rolls about axes perpendicular to the direction of movement of the extruded strip.

7. The method as set forth in claim 1 including the steps of cutting the extruded strip into desired lengths during its passage between the cooperating forming rolls.

8. The method as set forth in claim 7 including the step of cutting the metal backing strip into desired lengths during its passage between the cooperating forming rolls.

9. The method as set forth in claim 8 including simultaneously performing the steps of cutting to a desired length the extruded strip and the backing strip.

10. The method as set forth in claim 6 including rotating the forming rolls at a velocity such that their surface velocity is substantially equal to the velocity at which the first strip is extruded.

11. The method as set forth in claim 5 wherein the backing strip is a relative thin metal strip.

* * * * *

UNITED STATES PATENT AND TRADEMARK OFFICE
CERTIFICATE OF CORRECTION

PATENT NO. : 5,171,499
DATED : December 15, 1992
INVENTOR(S) : Edward C. Cehelnik et al It is certified that error appears in the above-indentified patent and that said Letters Patent is hereby corrected as shown below:

Column 2, line 53, "Figure 5" should be -- Figure 4 --

Column 5, line 20, Claim 2, "of" should be -- to --

Signed and Sealed this

Twenty-sixth Day of October, 1993

*Attest:*

BRUCE LEHMAN

*Attesting Officer*   *Commissioner of Patents and Trademarks*